United States Patent [19]
Fickes et al.

[11] Patent Number: 6,031,833
[45] Date of Patent: *Feb. 29, 2000

[54] METHOD AND SYSTEM FOR INCREASING THROUGHPUT IN A WIRELESS LOCAL AREA NETWORK

[75] Inventors: Stanley L. Fickes, San Jose; Edward W. Geiger, San Marten; Richard W. Mincher, San Jose, all of Calif.

[73] Assignee: Apple Computer, Inc., Cupertino, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/846,865

[22] Filed: May 1, 1997

[51] Int. Cl.[7] .............................. H04J 3/24; H04L 12/28
[52] U.S. Cl. ............................ 370/349; 370/913
[58] Field of Search ..................... 370/310, 322, 370/326, 329, 332, 341, 347, 348, 349, 465, 522, 449, 913; 395/182.01, 182.08, 202

[56] References Cited

U.S. PATENT DOCUMENTS

| | | | |
|---|---|---|---|
| 5,440,545 | 8/1995 | Bucholz et al. | 370/347 |
| 5,555,266 | 9/1996 | Bucholz et al. | 370/347 |
| 5,781,536 | 7/1998 | Ahmadi et al. | 370/252 |
| 5,802,062 | 9/1998 | Gehani et al. | 370/449 |

*Primary Examiner*—Huy D. Vu
*Assistant Examiner*—Chiho A. Lee
*Attorney, Agent, or Firm*—Sawyer & Associates

[57] ABSTRACT

Method and system aspects for increasing throughput in a WLAN are provided. In a method aspect, a packet is transmitted from a first end station in the WLAN, the packet including an indication of a next end station in a chain of end stations having data ready for transmission in the WLAN. The method further includes transferring control of access before a predetermined time period has been exceeded to the next end station in the chain of end stations based upon the indicator. In addition, the method includes maintaining access to the network for a plurality of cooperating end stations established through continuous indication of the next end station in the chain of end stations without exceeding a maximum access time. In a system aspect, the system includes a first end station, the first end station transmitting a packet in the WLAN, and a second end station in a chain end stations cooperating with the first end station and acknowledging the packet from the first end station before a predetermined time period has been exceeded, the second end station identifying a next end station in the chain end of end stations to have access in the WLAN. Further, transmission access to the WLAN continues with the next end station in the chain end stations when the predetermined time period is not exceeded between transmitting and acknowledging.

21 Claims, 4 Drawing Sheets

| Src | Type | Dst | ChnMe | NU | NUVa | NUVb | Comment |
|---|---|---|---|---|---|---|---|
| A | Data | B | 0 | - | * | * | |
| B | ACK | A | 0 | - | * | * | |

Figure 6A

| Src | Type | Dst | ChnMe | NU | NUVa | NUVb | Comment |
|---|---|---|---|---|---|---|---|
| A | Data | B | 1 | A | * | » A | |
| B | ACK | A | 0 | A | * | A | |
| A | Data | B | 1 | A | * | A | |
| B | ACK | A | 0 | A | * | A | |
| A | Data | B | 0 | - | * | * | Since A's ChainMe is false, B clears A from Its var |
| B | ACK | A | 0 | - | * | * | Chain ends |

Figure 6B

| Src | Type | Dst | ChnMe | NU | NUVa | NUVb | Comment |
|---|---|---|---|---|---|---|---|
| X | ? | Y | 1 | ? | » X | » X | A and B see X's ChainMe bit |
| ... | | | | | | | |
| A | Data | B | 0 | X | X | X | |
| B | ACK | A | 0 | X | X | X | |
| X | Data | W | 0 | ? | * | » * | Since X's ChainMe is false, A and B clear X from their vars |

Figure 6C

| Src | Type | Dst | ChnMe | NU | NUVa | NUVb | Comment |
|---|---|---|---|---|---|---|---|
| X | ACK | Y | 1 | ? | X | * | Observed by A but not B |
| ... | | | | | | | |
| A | Data | B | 0 | X | X | * | |
| B | ACK | A | 0 | X | X | X | Control passed to X |

Figure 6D

| Src | Type | Dst | ChnMe | NU | NUVa | NUVb | Comment |
|---|---|---|---|---|---|---|---|
| X | ACK | Y | 1 | ? | X | X | Observed by both A and B |
| ... | | | | | | | |
| Z | Data | Y | 1 | ? | X | Z | Observed by B and not A |
| ... | | | | | | | |
| A | Data | B | 0 | X | X | Z | |
| B | ACK | A | 0 | Z | X | Z | Control passed to Z, not X |
| Z | Data | W | 0 | ? | X | - | B sees Z clear its ChainMe bit, so clears Z from Its NU Var |

Figure 6E

METHOD AND SYSTEM FOR INCREASING THROUGHPUT IN A WIRELESS LOCAL AREA NETWORK

FIELD OF THE INVENTION

The present invention relates to wireless local area networks (WLANs) and more particularly to increasing throughput of data transmissions within a WLAN.

BACKGROUND OF THE INVENTION

The ability of computer users to access programs and share data through local area networks (LANs) has become a readily expected part of most working environments. The improved efficiency within a particular LAN environment is often enhanced with the convenience of remotely accessing the LAN. An important extension to LANs is the provision of a wireless LAN (WLAN).

In a WLAN, end station units suitably employ radio communication using an FCC allotted frequency band of, for example, 2390 MHz (megaHertz) to fulfill performance expectations of wired LANs but without costly wire installation. One example of a WLAN is illustrated in FIG. 1. As shown, three end station units 10, 12, and 14 are in range with one another and have formed a portion of a WLAN 16. Also included in WLAN 16 is an access point station 18 that can access both connection oriented and connection-less services. Access point station 18 thus may support connection to both a local Ethernet backbone and some form of telecommunication transport, such as ISDN, ATM, or T1, as is well appreciated by those skilled in the art.

With the inclusion of connection oriented stations within a WLAN, the connection oriented services provide a potential mechanism for reserving bandwidth, such as for real-time or time-bounded data transfers, which may require a high data transfer rate. The connection-less services suitably provide typical asynchronous access to the media in an fashion similar to Ethernet. Potential contention among varying unit types for communication in the WLAN raises significant issues for consideration in the development of standards for the WLAN.

The rules for communication in the 2390 MHz radio band for WLANs provide an etiquette for media access by end stations. In a simple transmission, a packet is sent from an end station to another, e.g., from end station 10 to end station 12, and the media is then allowed to return to a quiet/idle state. The etiquette requires that at least 50 microseconds ($\mu$s) of silence follows the packet transmission before another end station can utilize the media and transmit data. If an end station senses that the media is busy, it must pick a random backoff time and wait that period before attempting to access the media again. If the media is again busy, the end station must backoff and wait twice as long as the first backoff time before trying to access the media. The backoff doubling then continues until the length of the period exceeds 10 millisecond (ms), which can significantly reduce the efficiency of transmitting data in the network.

Accordingly, a need exists for a technique to achieve greater throughput with more efficient data transmission in a WLAN.

SUMMARY OF THE INVENTION

Accordingly, the present invention meets these needs and provides method and system aspects for increased throughput in a WLAN. In a method aspect, a packet is transmitted from a first end station in the WLAN, the packet including an indication of a next end station having data ready for transmission in the WLAN. The method further includes transferring control of access before a predetermined time period has been exceeded to the next end station based upon the indication. In addition, the method includes maintaining access to the network for a plurality of cooperating end stations established through continuous indication of the next end station without exceeding a maximum access time.

In a system aspect, the system includes a first end station, the first end station transmitting a packet in the WLAN, and a second end station cooperating with the first end station and acknowledging the packet from the first end station before a predetermined time period has been exceeded, the second end station identifying a next end station to have access in the WLAN. Further, transmission access to the WLAN continues with the next end station when the predetermined time period is not exceeded between transmitting and acknowledging.

With the present invention, a plurality of end stations within a WLAN more effectively access the media through chaining of end stations. The chaining is performed by advantageously utilizing designated access rules. Thus, cooperating end stations reduce idle time by passing control of access from one end station to another without violating predetermined maximum access times. Equal access to non-cooperating units is therefore also maintained. These and other advantages of the aspects of the present invention will be more fully understood in conjunction with the following detailed description and accompanying drawings.

BRIEF DESCRIPTION OF THE DRAWINGS

FIGS. 6a–6e illustrate representations of variable values under various transmission scenarios.

DETAILED DESCRIPTION

The present invention relates to effective and efficient utilization of media access in a WLAN. The following description is presented to enable one of ordinary skill in the art to make and use the invention and is provided in the context of a patent application and its requirements. Various modifications to the preferred embodiment and the generic principles and features described herein will be readily apparent to those skilled in the art.

Figure 1:
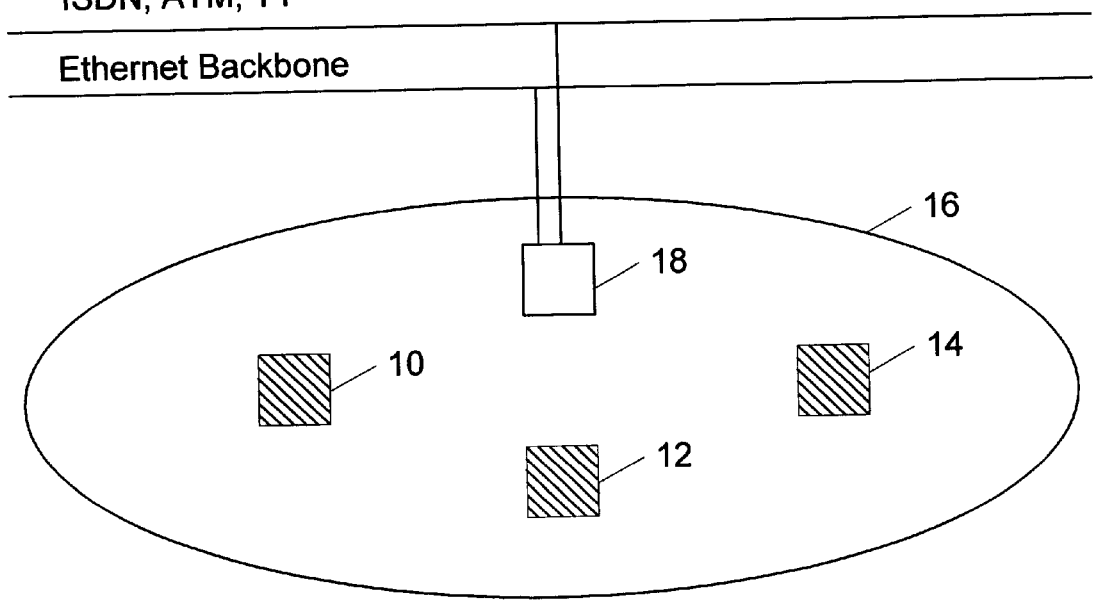
FIG. 1 illustrates a general diagram of a WLAN.
Figure 2:
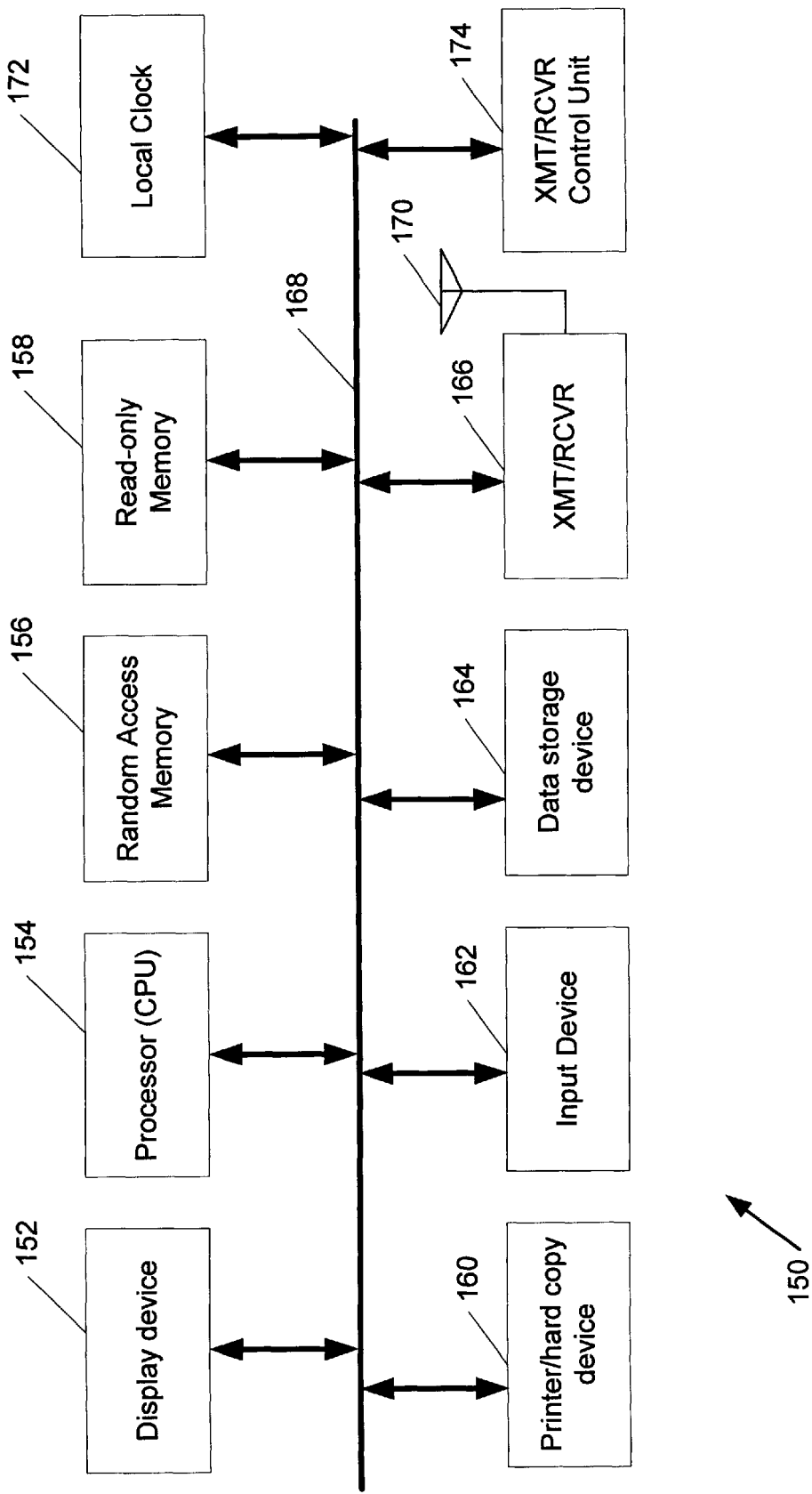
FIG. 2 illustrates a block diagram of a computer system suitable for use within a WLAN.

Each end station unit/node within the WLAN of FIG. 1 suitably comprises a computer system with an architecture illustrated in the block diagram of FIG. 2. The computer system 150 preferably comprises a display device 152, a CPU 154, random access memory (RAM) 156, read-only memory (ROM) 158, a printer or hard copy device 160, an input device 162, a data storage device 164, a transmitter/receiver 166, a common data pathway/bus 168, an antenna 170 coupled to the transmitter/receiver 166, a local clock 172, and a transmit/receive control unit 174. Suitably, transmit/receive control unit 174 may be provided with transmitter/receiver 166 as a separate PCB (printed circuit board) in the computer system 150 and include control logic in ASIC form, along with RAM and ROM for providing storage registers and programmed operations, that capably achieves cooperative data exchange in accordance with the present invention.

Figure 3:
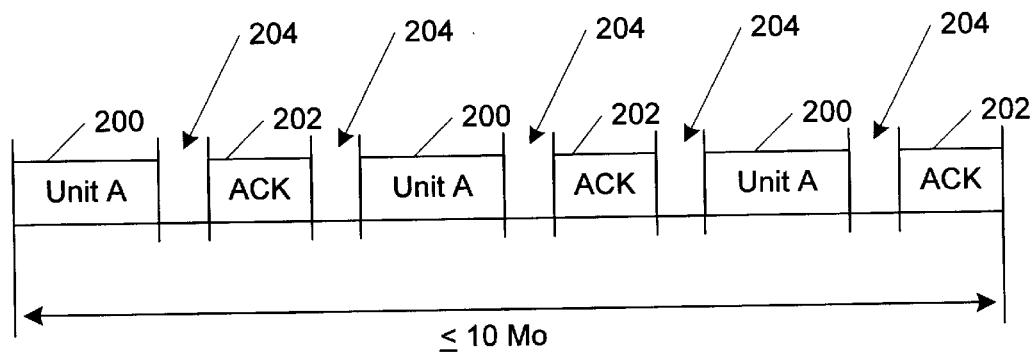
FIG. 3 illustrates a series of data packets from a first end station to a second end station with acknowledgement transmissions from the second end station.

In transmitting data between end stations in a WLAN, certain rules exist for media access, as mentioned above. For example, one rule establishes that a device or group of devices can participate in a transmission burst up to 10 ms in duration, providing that any intraburst gap, i.e., idle time between packets, does not exceed 25 μs. For purposes of this discussion, the group of devices adhering to this rule are suitably referred to as cooperating end stations. Thus, packet transmissions and corresponding acknowledgement packets suitably occur within the 25 μs limit in order to maintain access to the media. FIG. 3 illustrates a series of data packets 200 from a first end station to a second end station with acknowledgement transmissions 202 from the second end station that occurs within the rules of media access by cooperating end stations with the intraburst gap 204 not exceeding 25 μs. Of course, the number of packets and corresponding acknowledgements varies with each transmission. However, the limit of 10 ms of access by cooperating devices is not exceeded, which allows non-cooperating end stations to have an opportunity to access the media.

Figure 4:
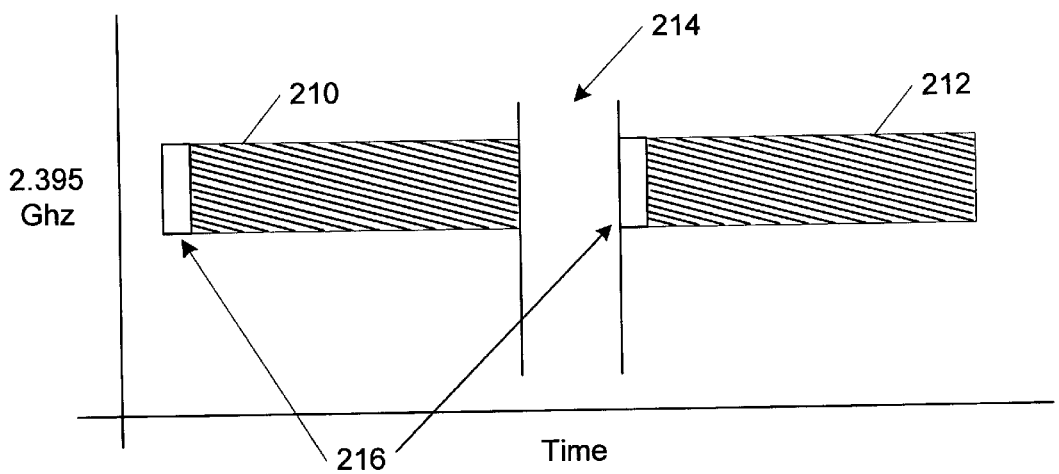
FIG. 4 illustrates an example of a packet transmission from a first end station followed by a packet transmission from a second end station according to a deference interval access rule.

Further, a second rule that a device or group of cooperating devices involved in a transmission burst must participate in a deference interval of uniform random distribution between 50 and 750 μs after a termination burst favors equal access to the media for non-cooperating end stations. FIG. 4 illustrates an example of a packet transmission 210 from a first end station followed by a packet transmission 212 from a second end station under the second rule. A deference interval 214 of at least 50 μs allows end stations not using the same access protocol or end stations that cannot communicate with each other to still have equal opportunity at accessing the media. Both transmissions 210 and 212 also allow for a required monitoring interval 216 of 50 μs before transmitting. While the provision of the deference interval favors maintenance of equal access to the media, unfortunately, the transmission of packets adhering to the deference rule is inefficient due to the many idle states that result. To more efficiently utilize the WLAN, while still adhering to these rules, the present invention suitably achieves media access by making each end station appear as a non-cooperating end station with the ability to become cooperating with other end stations once one end station has captured access to the media.

Extending the idea of cooperating devices, the present invention achieves greater efficiency by performing chaining of end stations. For chaining, once a sending end station has completed its transmission, control of the media is preferably passed to another end station that then sends its data until completion, and control is passed again to another end station and so on until no more cooperating end stations desire chaining or the 10 ms limit has been reached. In order to achieve the chaining, suitable control registers are provided within each end station, e.g., as components of transmit/receive control unit 174 (FIG. 2), and the stored values are utilized as fields within transmitted packets to maintain the chaining among cooperating end stations.

Figure 5:
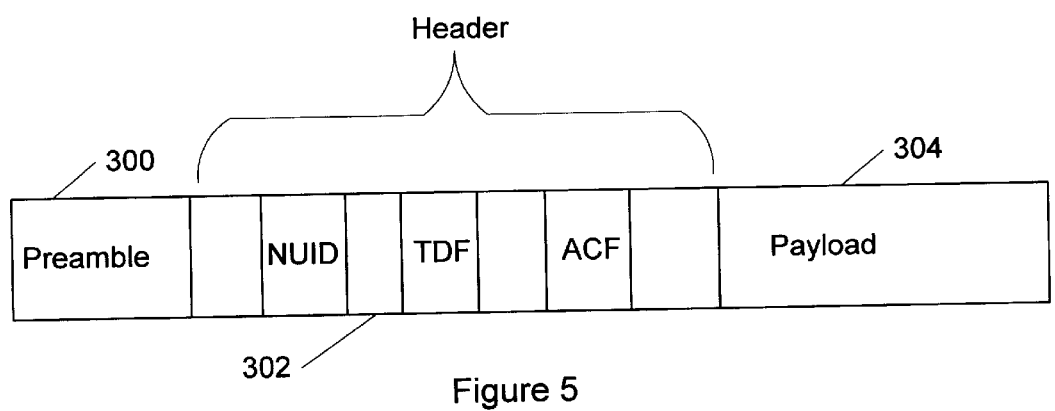
FIG. 5 illustrates portions of a packet.

By way of example, in a preferred embodiment, control mechanisms are utilized as fields within a packet header to support media access control. FIG. 5 suitably illustrates a packet including a preamble 300, a header 302, and payload/data portion 304. The control mechanisms include a next unit identification field (NUID), a transmission duration field (TDF), and an access control field (ACF). The NUID field suitably provides an indication of which end station has access privileges for 'tagging' onto the current transmission, and thus form a chain of transmissions. Suitably, the NUID field is used mainly for informational purposes in data packets, but causes control to be passed to the indicated end station in an acknowledgement packet.

The TDF preferably tracks the time period the current transmission burst has used under the rules. Thus, if the period that the next transmission is to use results in the TDF exceeding the 10 ms limit, the next 'tagging' operation cannot be completed. Suitably, then, the control logic of each end station adds the length of time its current data or acknowledgement packet will take to the latest received TDF and determines whether it can send its packet without violating the 10 ms limit.

The ACF suitably contains multiple flags, including flags providing information regarding acknowledgements and a reserve bandwidth period. One of the flags preferably indicates whether the current transmission requires an acknowledgement. If an acknowledgement is expected, then the next end station in the chain appropriately waits for the acknowledgement before tagging onto the transmission. If a reserve bandwidth flag in the ACF is set, the NUID field is suitably updated to indicate that end stations requiring reserve bandwidth are now acting as cooperating end stations for tagging. Reserve bandwidth transmissions suitably refer to transmissions of real-time data, such as voice and video, as is well understood by those skilled in the art. Preferably, there are recognized periods during which reserve bandwidth data may transmit. A suitable mechanism for providing reserve bandwidth periods is described in co-pending U.S. patent application, Ser. No. (08/869,011), filed May 28, 1997, and entitled "Method and System for Synchronization in a Wireless Local Area Network". The ACF also suitably includes a flag indicating whether the transmitting end station has at least one packet queued and ready to transmit. Suitably, a true value, '1', indicates the transmitting end station has queued data, while a false value, '0', indicates the transmitting end station does not have queued data.

FIGS. 6a–6e provide representations of the values for utilization within the header fields under various transmission scenarios. The representations are discussed with reference to two end stations, UnitA and UnitB, within a WLAN that also includes other end stations, e.g., UnitW, UnitX, UnitY, and UnitZ. For each of these representations, 'Src' suitably identifies the source of the packet, 'Type' indicates the type of the packet, e.g., Data packet or ACK (acknowledgement) packet, 'Dst' identifies the destination end station of the packet, 'ChnMe' indicates a status for a flag in the ACF that identifies whether the transmitting packet has data queued and ready to transmit, 'NU' identifies the end station whose address is to be supplied in the NUID field, e.g., an alphabetic letter represents the next end station, a "-" indicates a chain is to end and a "?" indicates a don't care state, and 'NUVa' and 'NUVb' indicates the register values of UnitA and UnitB, respectively, for a next unit value for use in the NUID field, with '*' representing a cleared register value.

FIG. 6a illustrates values existing when a simple transfer from UnitA to UnitB occurs with no chaining. The first line of the diagram indicates that the source of a first packet is UnitA. Further indicated is that it is a data packet destined for UnitB. UnitA does not have data queued and ready to transmit (e.g., ChnMe is '0'), chaining is disabled, (e.g., NU is '-'), and no value exists in the registers for UnitA or UnitB for an address of a next unit, (e.g., NUVa and NUVb are '*'). The second line of the diagram indicates that the source of the next packet is UnitB, it is transmitting an acknowledgement packet to UnitA, it does not have data queued, and it lacks a value for a next unit FIG. 6b illustrates a series of transfers with UnitA requesting and being granted chaining to itself until UnitA ends the chaining. The series begins with UnitA sending a data packet to UnitB and indicating that it has data queued and desires chaining. UnitB receives the packet, updates NUVb to the address for UnitA, and then sends an acknowledgement back to UnitA indicating that it does not have data queued and that UnitA is the next unit to be chained to. UnitA then sends another data packet to UnitB again indicating it has data queued and desires chaining. UnitB then sends another acknowledgement back to UnitA indicating that it does not have data queued and that UnitA is the next unit for chaining. UnitA then sends a third packet to UnitB, but in this packet, indicates that it does not have data queued and does not desire chaining. UnitB receives the packet, clears UnitA as the next unit for chaining, and sends an acknowledgement back to UnitA before the chain ends.

FIG. 6c illustrates an observation by UnitA to a UnitX's request for chaining, and chains to that end station. From the viewpoint of UnitA and UnitB, a UnitX sends a packet to a UnitY indicating that UnitX has data queued and both UnitX and UnitY have the address for UnitX stored for chaining. Accordingly, both UnitA and UnitB store the address for UnitX in the NUV registers. Once UnitA gains media access and sends a data packet to UnitB, UnitA indicates that it does not have data queued but is set to chain to UnitX. UnitB then acknowledges the packet from UnitA indicating that it too lacks queued data and that UnitX is the end station to be chained to. UnitX then gains control of the access and sends a data packet to a UnitW, indicating that it no longer has data queued, which clears the address for UnitX from the NUV registers of UnitA and UnitB.

FIG. 6d illustrates an observation by UnitA for a request for chaining by UnitX that is not observed by UnitB with the chaining still successfully achieved. A UnitX sends an acknowledgement packet to a UnitY indicating that it has data queued, which registers the address for UnitX as UnitA's next unit variable, NUVa. UnitB fails to see the request for chaining by UnitX and thus its register value, NUVb, remains unchanged. Then, when UnitA gains access and sends a data packet to UnitB indicating it does not have data queued, it identifies UnitX as the end station to be chained to. UnitB then sends an acknowledgement to UnitA indicating that it too lacks queued data but with recognition of the need to chain to UnitX from the packet from UnitA. Thus, control of access then passes to UnitX.

FIG. 6e illustrates an observation by UnitA and UnitB of a request for chaining by UnitX and another observation by UnitB only of a request for chaining by UnitZ. UnitX sends an acknowledgement packet to UnitY indicating that it has data queued, which both UnitA and UnitB observe resulting in the address for UnitX being stored in the next unit registers of UnitA and UnitB. Another unit, UnitZ, then sends a data packet to UnitY indicating that it has data queued, which UnitB observes and UnitA does not observe. Thus, the next unit register for UnitA maintains the address for UnitX while the next unit register for UnitB updates to the address for UnitZ. When UnitA gains access, it sends a data packet to UnitB, indicates that it does not have data queued, and that UnitX requires chaining. However, UnitB still sees UnitZ as the next unit. So, UnitB sends an acknowledgement packet to UnitA indicating that no data is queued and that the next unit is UnitZ. Control of access then passes to UnitZ, which sends a data packet to a UnitW indicating no data is queued. This clears the address for UnitZ from the next unit register of UnitB. Preferably, UnitB, representing the acknowledgement unit, chooses which unit chains next, since the UnitX may not be able to see the acknowledgement sent by UnitB.

As shown by the transmission scenarios of FIGS. 6a–6e, chaining of end stations to maintain media access and increase data throughput in a WLAN is capably achieved. In general, when a first end station observes a set flag for chaining in a packet, the first end station stores the address for the packet's source in a designated register. When a packet is observed that clears the flag, the address is removed from the designated register. Further, when an end station sends an acknowledgement packet and its register is cleared, the register value indicated by the received data packet is suitably stored in the register. Alternatively, the register value could be indicated by a software routine that determines a next end station. Preferably, the setting and clearing of flags and values during the chaining operation are performed through hardware, i.e., transmit/receive control unit 174, to avoid any lack of observation of a packet, as might occur when relying on software, and to better respond to the quickly changing conditions in the network.

Although the present invention has been described in accordance with the embodiments shown, one of ordinary skill in the art will recognize that there could be variations to the embodiment and those variations would be within the spirit and scope of the present invention. For example, although the transfer of control from one station to the next has been described as utilizing an acknowledge packet, one of ordinary skill in the art readily recognizes that the transfer can occur in a number of ways, the key point being that the transfer is initiated based on an indication that a next end station has data that is ready for transmission. Accordingly, many modifications may be made by one of ordinary skill without departing from the spirit and scope of the present invention, the scope of which is defined by the following claims.

What is claimed is:

1. A method for increasing throughput in a wireless local area network (WLAN), the method comprising:

transmitting a packet from a first end station in the WLAN, the packet including an indication of a next end station in a chain of end stations having data ready for transmission in the WLAN;

transferring control of access before a predetermined time period has been exceeded by the first end station to the next end station in the chain of end stations based on the indication;

maintaining access to the network for a plurality of cooperating end stations established through continuous indication of the next end station in the chain of end stations without exceeding a maximum access time.

2. The method of claim 1 in which the transfer control is performed when the packet is an acknowledgement packet.

3. The method of claim 1 further comprising providing a duration indicator in the packet.

4. The method of claim 3 further comprising utilizing the duration indicator to ensure the maximum access time is not exceeded by the plurality of cooperating end stations in the chain of end stations.

5. The method of claim 4 wherein the predetermined time period comprises 25 µs.

6. The method of claim 1 wherein the maximum access time comprises 10 ms.

7. The method of claim 3 wherein the duration indicator and the indication of the next end station in the chain of end stations comprise fields in a header portion of the packet.

8. A method for increasing throughput in a wireless local area network (WLAN), the method comprising:

(a) sending a packet from a first end station in the WLAN;

(b) sending an acknowledgement from a second end station in a chain of end stations before a predetermined time period has been exceeded, the acknowledgement including an indication of a next end station in the chain of end stations needing media access;

(c) transferring control of access to the next end station in the chain of end stations; and (d) repeating steps (a) through (c) with the next end station in the chain of end stations becoming the first end station.

9. The method of claim 8 wherein the step of repeating proceeds until a maximum access time has been reached.

10. The method of claim 9 wherein the step of repeating does not proceed when no more data requires transmission and the maximum access time has not been reached.

11. The method of claim 9 wherein the maximum access time comprises 10 ms.

12. The method of claim 8 wherein the predetermined time period comprises 25 $\mu$s.

13. The method of claim 8 wherein the indication of the next end station in a chain of end stations comprises a field in a header portion of the packet.

14. A system for increasing throughput in a WLAN, the WLAN comprising a plurality of end stations, the system comprising:

a first end station, the first end station transmitting a packet in the WLAN;

a second end station in a chain of end stations, the second end station cooperating with the first end station and acknowledging the packet from the first end station before a predetermined time period has been exceeded, the second end station identifying a next end station in the chain of end stations to have access in the WLAN;

wherein transmission access to the WLAN continues with the next end station in the chain of end stations when the predetermined time period is not exceeded between transmitting and acknowledging.

15. The system of claim 14 wherein the second end station in the chain of end stations identifies the first end station as the next end station in the chain of end stations when the first end station transmits a queued data indicator in the packet.

16. The system of claim 14 wherein the transmission access ends when a maximum access time is reached.

17. The system of claim 14 wherein the first end station further includes a duration indication in the packet.

18. The system of claim 17 wherein the duration indication is updated by the next end station in the chain of end stations.

19. The system of claim 17 wherein each of the plurality of end stations in the chain of end stations further comprises a transmit/receive control unit.

20. The system of claim 19 wherein the transmit/receive control unit updates the duration indication in a transmitted packet.

21. The system of claim 19 wherein the transmit/receive control unit further stores an address value for the next end station in the chain of end stations.

* * * * *